(12) United States Patent
Lacy et al.

(10) Patent No.: US 8,226,998 B2
(45) Date of Patent: *Jul. 24, 2012

(54) ICE CONFECTIONS

(75) Inventors: Ian Lacy, Sharnbrook (GB); Loyd Wix, Sharnbrook (GB)

(73) Assignee: Conopco, Inc., Englewood Cliffs, NJ (US)

( * ) Notice: Subject to any disclaimer, the term of this patent is extended or adjusted under 35 U.S.C. 154(b) by 1075 days.

This patent is subject to a terminal disclaimer.

(21) Appl. No.: 11/633,806

(22) Filed: Dec. 5, 2006

(65) Prior Publication Data

US 2007/0134404 A1    Jun. 14, 2007

(30) Foreign Application Priority Data

Dec. 14, 2005    (EP) .................................... 05257672

(51) Int. Cl.
*A23G 9/00* (2006.01)

(52) U.S. Cl. ........................ 426/101; 426/100

(58) Field of Classification Search ................ 426/100, 426/101, 565
See application file for complete search history.

(56) References Cited

U.S. PATENT DOCUMENTS

| | | | |
|---|---|---|---|
| 4,626,441 A | 12/1986 | Wolkstein | |
| 4,954,360 A * | 9/1990 | Barnett | 426/565 |
| 5,246,725 A | 9/1993 | Fisher et al. | |
| 5,456,936 A | 10/1995 | Toonen et al. | |
| 5,853,785 A | 12/1998 | Nayyar et al. | |
| 5,968,582 A * | 10/1999 | Vaghela et al. | 426/565 |
| 6,120,813 A * | 9/2000 | Barnes et al. | 426/66 |
| 6,491,960 B1 * | 12/2002 | Daniel et al. | 426/565 |
| 2003/0031758 A1 | 2/2003 | Koss et al. | |
| 2004/0091597 A1 * | 5/2004 | Ghaffari et al. | 426/565 |
| 2004/0197379 A1 | 10/2004 | Ryan et al. | |

FOREIGN PATENT DOCUMENTS

JP    01218553 A  *  8/1989
WO    93/21777       11/1993

OTHER PUBLICATIONS

Marshall et al, Ice Cream, 2000, Aspen Publication, pp. 140-141.*
Marshall et al, Ice Cream, Chapter 4, "Composition and Properties", Fifth Edition, 2000, pp. 22-23, 28, Table 4.1, XP002282748.
European Search Report Application No. EP 05 25 7672 dated May 8, 2006.
International Search Report International application No. PCT/EP2006/011387 mailed Mar. 19, 2007.

* cited by examiner

*Primary Examiner* — Jyoti Chawla
(74) *Attorney, Agent, or Firm* — Michael P. Aronson

(57) ABSTRACT

An ice confection is provided, having a total solids content of from 15 to 30% by weight of the ice confection and total sugar in an amount of less than 17% by weight of the ice confection, characterized in that the ice confection comprises digestible complex saccharides in an amount of from 2 to 25% by weight of the ice confection; and non-saccharide sweeteners in a total amount $C_T$ given by the following condition:

$$C_T < X/R,$$

wherein X is 0.5 wt % and R is the sweetness of the non-saccharide sweeteners relative to sucrose expressed on a weight basis.

8 Claims, No Drawings

ICE CONFECTIONS

TECHNICAL FIELD OF THE INVENTION

The present invention relates to ice confections such as water ices, fruit ices, milk ices and the like. In particular, it relates to ice confections having low sugar contents.

BACKGROUND

Ice confections, such as ice lollies, popsicles and the like are popular products, and are especially enjoyed by children. These products are typically made from water ice, fruit ice or milk ice, rather than from ice cream, and therefore generally contain low levels of fat. However, they nonetheless contain relatively high amounts of sugar.

Parents are concerned about damage to their children's teeth as a result of consuming foods which contain sugars. Moreover, the incidence of obesity and the number of people considered overweight in countries where a so-called Western diet is adopted has drastically increased over the last decade. Since obesity and being overweight are generally known to be associated with a variety of diseases such as heart disease, type 2 diabetes, hypertension and arteriosclerosis, this increase is a major health concern for the medical world and for individuals alike. Furthermore, being overweight is considered by the majority of the Western population as unattractive. This has led to an increasing interest by consumers in their health and has created a demand for products that help to reduce or control daily caloric intake. In particular, the importance of limiting the content of sugars in a healthy diet has recently been highlighted by a Joint WHO/FOA Expert Committee (see "Diet, nutrition and the prevention of chronic diseases"—Report of a Joint WHO/FAO Expert Consultation, *WHO Technical Report Series* 916, WHO, Geneva, 2003).

Lowering the sugar content of ice confections results in products that are not sweet. They are also very hard as a result of the low level of freezing point depressants. This is especially so for quiescently frozen ice confections because quiescent freezing results in large ice crystals. There have been previous attempts to formulate water ices having reduced sugar content whilst retaining their palatability. U.S. Pat. No. 4,626,441 discloses dietetic frozen desserts which have essentially all the sugar present in conventional products replaced by a non-saccharide sweeteners (e.g. aspartame and sugar alcohols) and bulking agents. Unfortunately, however, replacement of the sugars in ice confections with non-saccharide sweeteners results in products with an artificial or even unpleasant taste and/or aftertaste. Furthermore, certain non-saccharide sweeteners such as sugar alcohols can cause digestive discomfort in some individuals. Thus, there remains a need for palatable ice confections which contain reduced amounts of sugars.

TESTS AND DEFINITIONS

Unless defined otherwise, all technical and scientific terms used herein have the same meaning as commonly understood by one of ordinary skill in the art (e.g. in frozen confectionery manufacture). Definitions and descriptions of various terms and techniques used in frozen confectionery manufacture are found in Ice Cream, $6^{th}$ Edition, Robert T. Marshall, H. Douglas Goff and Richard W. Hartel (2003), Kluwer Academic/Plenum Publishers.

All percentages, unless otherwise stated, refer to the percentage by weight, with the exception of percentages cited in relation to the overrun.

Water Ice

As used herein, the term water ice refers to a sweet-tasting substantially fat and protein free fabricated foodstuff intended for consumption in the frozen state (i.e. under conditions wherein the temperature of the foodstuff is less than 0° C., and preferably under conditions wherein the foodstuff comprises significant amounts of ice). By substantially fat and protein free it is meant that the fat content is less than 0.5 wt % and that the protein content is less than 0.5 wt %. Water ices may be unaerated or aerated, but are normally unaerated.

Fruit Ice

Fruit ices are water ices which contain at least 10% fruit. Fruit means edible part of fruit or the equivalent as juice, extracts, concentrated or dehydrated products and so on. Fruit, pulp, juice or any other preparation may be used either fresh or preserved by any convenient technical process.

Total Solids Content

The total solids content of an ice confection is the dry weight of the confection, i.e. the sum of the weights of all the ingredients other than water, expressed as a percentage of the total weight. It is measured as described in Ice Cream, $6^{th}$ Edition, Marshall et al. (2003) p 296.

Sugars

As used herein the term "sugars" refers exclusively to digestible mono- and di-saccharides. The total sugar content of an ice confection is thus the sum of all of the digestible mono- and di-saccharides present within the ice confection, including any sugars from fruits and lactose from milk solids.

Complex Saccharides

As used herein, the term "complex saccharide" refers to oligosaccharides and polysaccharides with a degree of polymerisation (DP) of at least three.

Digestible and Non-Digestible Saccharides

Digestible saccharides are defined as those saccharides with a metabolisable energy content of at least 3 kcal (12.6 kJ) per g of saccharide. Digestible complex saccharides are usually derived from starch and/or comprise alpha glycosidic linkages.

Non-digestible saccharides are defined as those saccharides with a metabolisable energy content of less than 3 kcal (12.6 kJ) per g of saccharide. Common non-digestible saccharides are non-starch complex saccharides but others include resistant starches and non-digestible di-saccharides.

Non-Saccharide Sweetener

Non-saccharide sweeteners as defined herein consist of:

The intense sweeteners aspartame, saccharin, acesulfame K, alitame, thaumatin, cyclamate, glycyrrhizin, stevioside, neohesperidine, sucralose, monellin and neotame; and The sugar alcohols HSH (hydrogenated starch hydrosylate—also known as polyglycitol), eythritol, arabitol, glycerol, xylitol, sorbitol, mannitol, lactitol, maltitol, isomalt, and palatinit.

Relative Sweetness

As defined herein, relative sweetness, R, refers to the sweetness of a substance relative to the sweetness of an equivalent weight of sucrose (i.e. sucrose has a relative sweetness of 1). The relative sweetness of the non-saccharide sweeteners is given in Table 1.

TABLE 1

| Non-Saccharide Sweetener (i) | Relative sweetness ($R_i$) |
|---|---|
| Aspartame | 200 |
| Saccharin | 400 |
| Acesulfame K | 200 |
| Alitame | 2,000 |
| Thaumatin | 2,000 |
| Cyclamate | 35 |
| Glycyrrhizin | 50 |
| Stevioside | 100 |
| Neohesperidine | 1,500 |
| Sucralose | 500 |
| Monellin | 2,000 |
| Neotame | 10,000 |
| HSH | 0.7 |
| Erythritol | 0.7 |
| Arabitol | 0.5 |
| Glycerol | 0.8 |
| Xylitol | 1.0 |
| Sorbitol | 0.6 |
| Mannitol | 0.6 |
| Lactitol | 0.4 |
| Maltitol | 0.8 |
| Isomalt | 0.6 |
| Palatinit | 0.5 |

For a mixture of non-saccharide sweeteners, the relative sweetness, R, is defined by Equation 1:

$$R = \frac{\sum_i R_i m_i}{\sum_i m_i}, \quad (1)$$

wherein $m_i$ is the mass of non-saccharide sweetener i.

BRIEF DESCRIPTION OF THE INVENTION

We have found that ice confections with low levels of sugars but with excellent palatability can be formulated even without the use of non-saccharide sweeteners by employing a sweetener system comprising sugars and digestible complex saccharides in specific amounts.

Accordingly, in a first aspect, the present invention provides an ice confection having a total solids content of from 15 to 30% by weight of the ice confection and total sugar in an amount of less than 17% by weight of the ice confection, characterised in that the ice confection comprises digestible complex saccharides in an amount of from 2 to 25% by weight of the ice confection; and non-saccharide sweeteners in a total amount $C_T$ given by the following condition:

$$C_T < X/R,$$

wherein X is 0.5 wt % and R is the sweetness of the non-saccharide sweeteners relative to sucrose expressed on a weight basis.

Preferably, X is 0.1 wt %, more preferably 0.01 wt %.

Ice confections according to the present invention contain ice. Since the total solids content is from 15 to 30 wt %, the water content is correspondingly from 85 to 70 wt %. At a temperature of −18° C. most, but not all, of the water is frozen.

Preferably the total solids content is at least 17% by weight of the ice confection, more preferably at least 20%. Preferably the total solids content is at most 28%, more preferably at most 25%. It is particularly preferred that the total solids content is from 21 to 24 wt %.

In order to maximise the nutritional quality of the confection it is necessary to limit the amount of sugars to less than 17 wt %. A certain level of total sugars is desirable, however, in order to provide freezing point depression and contribute to the sweetness of the confection. Thus it is preferred that the ice confection comprises at least 7 wt % total sugars, more preferably at least 8% or 10% and most preferably at least 12%. It is particularly preferred that the sugars are present in an amount of from 15 to 17 wt %.

Fructose has a high relative sweetness and it has been found that at levels of at least 2% by weight of the ice confection, preferably at least 3%, more preferably at least 4%, the fructose (in combination with other saccharides) provides sufficient sweetness to negate the need for non-saccharide sweeteners. Recent research has highlighted potential adverse effects of a high fructose intake on cardiovascular risk factors owing to the way in which fructose is metabolised. Therefore it is preferred that there is less than 12 wt % fructose by weight of the ice confection, more preferably less than 10%, even more preferably less than 9%.

As well as fructose, the total sugar may comprise one or more monosaccharides such as glucose (dextrose) or galactose, and/or one or more disaccharides such as lactose, maltose or sucrose.

In order to compensate for the relatively low levels of sugars employed, it is necessary that the ice confection comprises digestible complex saccharides in an amount of at least 2% by weight of the ice confection, preferably at least 3%, more preferably at least 4% and most preferably at least 5%. To avoid the confection becoming overly hard, however, it is necessary that the digestible complex saccharide is used in an amount of less than 25% by weight of the ice confection, preferably less than 20%, more preferably less than 15% and most preferably less than 12%.

The complex saccharide can cause the ice confection to become hard and unpalatable owing to its relatively high molecular weight. Thus, although the digestible complex saccharide may be sourced from any suitable material, such as maltodextrin, starch or glucose syrup (also known as "corn syrup"), it is preferred that the digestible complex saccharide is substantially sourced from a glucose syrup having a DE greater than 20. Particularly preferred are glucose syrups having a DE in the range 22 to 45 DE as they contain complex saccharides of not too high a molecular weight whilst not contributing large amounts of sugars. Most preferred are glucose syrups having a DE in the range 22 to 34. Most convenient are glucose syrups comprising sugars in an amount of from 8 to 35% by dry weight of the glucose syrup, preferably from 10 to 25%.

In one embodiment of the invention, the ice confection further comprises non-digestible saccharides, as such materials can contribute to the freezing point depression and/or body of the confection without increasing the sugar content of the confection or contributing to sweetness. Preferably the non-digestible saccharide is employed in an amount of at least 2% by weight of the ice confection, preferably at least 3%, and most preferably at least 4%. In order to avoid undue freezing point depression and/or undue hardness it is preferred that the non-digestible saccharide is present in an amount of less than 15% by weight of the ice confection, preferably less than 10% and most preferably less than 9%.

Suitable non-digestible saccharides include oligofructose, inulin, polydextrose, resistant starch and mixtures thereof.

Oligofructose and inulin are both available from the ORAFTI company under the trade names Raftilose™ and Raftiline™, respectively. Inulin and oligofructose are composed of linear chains of fructose units linked by β(2-1) bonds and often terminated by a glucose unit. Inulin contains chains with up to 60 fructose units. Oligofructose has between 2 and 7 fructose units. Oligofructose is obtained from inulin by partial enzymatic hydrolysis. Inulin has a metabolisable energy content (calorie conversion factor) of 1.2 kcal (5.0 kJ) $g^{-1}$, whilst oligofructose has a metabolisable energy content (calorie conversion factor) of 2 kcal (8.4 kJ) $g^{-1}$. Despite its higher energy content, oligofructose is the preferred source of non-digestible saccharide for use in the present invention owing to its low molecular weight and therefore high freezing point depression power.

Polydextrose is a randomly bonded condensation polymer of D-glucose with some bound sorbitol and citric acid. The 1,6-glycosidic linkage predominates in the polymer. Polydextrose is resistant to digestion in the human small intestinal tract and has a metabolisable energy content (calorie conversion factor) of 1.0 kcal (4.2 kJ) $g^{-1}$. It is available from the Danisco company under the trade name Litesse™. Polydextrose has a relatively high molecular weight of around 2500.

Resistant starches are food starches or starch derivatives which are not digestible by the human body. There are four main groups of resistant starches: RS1, RS2, RS3 and RS4. RS1 is physically inaccessible starch, e.g. trapped in seeds. RS2 starch is granular starch. Examples include banana, high amylose starches. RS3 starch is a highly retrograded starch, e.g. extruded cereals. RS4 is chemically modified starch. Resistant starches have a metabolisable energy content (calorie conversion factor) of around 1.6 kcal (6.7 kJ) $g^{-1}$. Resistant starches are available commercially from National Starch under the trade names Novelose™ and Hi-maize™.

The ice confection may be aerated or unaerated. Preferably the ice confection is unaerated. By unaerated is meant an overrun of less then 20%, preferably less than 10%. An unaerated ice confection is not subjected to deliberate steps such as whipping to increase the gas content. Nonetheless, it will be appreciated that during the preparation of unaerated ice confections, low levels of gas, such as air, may be incorporated in the product.

Preferably the ice confection is a water ice or a fruit ice.

The ice confections may also comprise a stabiliser. Stabilisers that may be used include proteins such as gelatin; plant extrudates such as gum arabic, gum ghatti, gum karaya, gum tragacanth; seed gums such as locust bean gum, guar gum, psyyllium seed gum, quince seed gum or tamarind seed gum; seaweed extracts such as agar, alganates, carrageenan or furcelleran; pectins such as low methoxyl or high methoxyl-type pectins; cellulose derivatives such as sodium carboxymethyl cellulose, microcrystalline cellulose, methyl and methylethyl celluloses, or hydroxylpropyl and hydroxypropylmethyl celluloses; and microbial gums such as dextran, xanthan or β-1, 3-glucan. Preferably, the stabiliser is selected from locust bean gum, kappa carrageenan, guar gum or mixtures thereof. Preferably the stabilisers are present at a level of 0.05 to 1% by weight of the ice confection.

The ice confections provided by the present invention afford consumers the everyday enjoyment of a popular food without delivering too high a sugar content. The ice confections of this invention may also suitably provide a low sugar base for delivering nutritional actives. Thus in a preferred embodiment the ice confection is fortified with one or more nutritional actives. The nutritional actives may be a mineral, a vitamin, a pro-biotic, a pre-biotic, an antioxidant, an essential oil, a plant sterol, an appetite suppressant, or a bioactive peptide.

The ice confections of the present invention are particularly suitable for storage and consumption from the domestic deep freeze. Thus it is preferred that the temperature of the ice confection is below −12° C., more preferably below −14° C. and most preferably in the range −25 to −16° C.

The ice confections may be manufactured by any suitable process. However, in a further aspect of the invention there is provided a process for manufacturing the ice confection, the process comprising the steps of:
 (a) preparing a mix of ingredients; then
 (b) pasteurizing and optionally homogenizing the mix; then
 (c) freezing and optionally aerating the mix to produce the ice confection.

Preferably freezing is quiescent. It has been found that the low-sugar ice confections of the present invention have an acceptable texture, even when they are quiescently frozen. By quiescent (or static) freezing, it is meant a process wherein the mix is cooled below its freezing point, such that partial or total solidification occurs through ice crystal formation, in the absence of an imposed shear field. Thus the liquid is frozen without it being deliberately agitated, mixed or shaken during freezing. Examples of quiescent processes include (but are not limited to) placing a container containing the mix into a cold environment and immersing a mould containing the mix in a bath of cold refrigerant.

DETAILED DESCRIPTION

The present invention will now be further described with reference to the following examples, which are illustrative only and non-limiting.

EXAMPLES

Example water ices according to the invention were prepared using the formulations shown in Table 2. These were chosen so that the water ices have an ice content of approximately 65 wt % at −18° C., typical of a standard water ice product. Comparative example A is a conventional water ice formulation and contains 19.1 wt % sugar. In Examples 1 to 5 some of the sugars are replaced with digestible complex saccharides. In Example 6, some of the sugars are additionally replaced with non-digestible complex saccharides.

TABLE 2

| Ingredient (wt %) | Comparative A | 1 | 2 | 3 | 4 | 5 | 6 |
|---|---|---|---|---|---|---|---|
| Dextrose | 10.0 | 4.0 | 8.0 | 12.0 | 6.0 | 4.0 | 4.0 |
| Fructose | 10.0 | 11.8 | 8.0 | 4.5 | 6.0 | 4.0 | 4.0 |
| 28 DE glucose syrup | 0.0 | 6.0 | 6.0 | 6.0 | 12.0 | 18.0 | 14.0 |
| Raftilose ™ | 0.0 | 0.0 | 0.0 | 0.0 | 0.0 | 0.0 | 4.35 |
| Locust bean gum | 0.2 | 0.05 | 0.20 | 0.05 | 0.20 | 0.2 | 0.2 |
| Citric acid | 0.25 | 0.45 | 0.25 | 0.45 | 0.25 | 0.25 | 0.25 |
| Water | to 100 | to 100 | to 100 | to 100 | to 100 | to 100 | to 100 |
| Total solids | 19.5 | 21.7 | 21.5 | 21.7 | 23.4 | 25.4 | 25.8 |
| Total sugar | 19.1 | 16.2 | 16.1 | 16.2 | 13.1 | 10.1 | 9.8 |

TABLE 2-continued

| Ingredient (wt %) | Comparative A | 1 | 2 | 3 | 4 | 5 | 6 |
|---|---|---|---|---|---|---|---|
| Digestible complex saccharides | 0.0 | 5.0 | 5.0 | 5.0 | 9.9 | 14.9 | 11.6 |
| Non-digestible complex saccharides | 0.0 | 0.0 | 0.0 | 0.0 | 0.0 | 0.0 | 4.0 |
| Ice content | 65.5 | 65.4 | 65.5 | 65.3 | 65.6 | 66.6 | 66.6 |

The dextrose was supplied as a monohydrate. The 28DE glucose syrup was C*Dry™ GL 01924, supplied by Cerestar (France) and had a moisture content of 4 wt %. On a dry basis the glucose syrup solids consisted of 14 wt % sugars (consisting of 3% dextrose and 11% maltose) and 86 wt % digestible complex saccharides (consisting of 16.5% maltotriose and 69.5% higher saccharides). Raftilose™ P95 was supplied by ORAFTI (Tienen, Belgium) and had a moisture content of 3 wt %. On a dry basis the Raftilose™ consisted of 95 wt % oligofructose and 5 wt % sugars (consisting of 3% sucrose, 1% fructose and 1% glucose).

Water ice products in the form of ice lollies (approximately 100 mls in volume) on sticks were prepared as follows. First the dry ingredients were mixed with hot water and stirred until they had completely dissolved. The mix was then pasteurized and placed in moulds. The moulds were immersed in a brine bath at −40° C. to quiescently freeze the mix and sticks were inserted. After the products had frozen, they were removed from the moulds and stored at −18° C. before being subjected to sensory assessment.

A blind product test was conducted using a panel of 12 assessors to assess the sensory characteristics of the water ice products of examples 1 to 5 and comparative example A, in particular the hardness and sweet taste. The assessors consumed a quarter of each product. The test design was balanced for serving order of the samples, and each product was assessed 3 times by each assessor. The hardness was assessed by biting the end off with the front teeth. Samples were scored on a scale of 0 to 10 (where 0 is not hard/sweet and 10 is very hard/sweet).

The results of the sensory analysis are shown in Table 3. It can be seen that examples 1, 2 and 3 had hardness and sweet taste scores close to those of the standard water ice, comparative example A. Examples 4 and 5, which contain very low amounts of total sugar are somewhat harder and less sweet than comparative example A. Nonetheless they were judged to be acceptable products, both in terms of taste and texture. Thus by carefully selecting the type and amounts of digestible complex saccharides in combination with the sugars, water ices with reduced sugar content and acceptable sweetness and texture were obtained, without needing to use non-saccharide sweeteners.

TABLE 3

| | Comparative A | Example 1 | 2 | 3 | 4 | 5 |
|---|---|---|---|---|---|---|
| Hardness | 2.0 | 2.2 | 2.2 | 2.4 | 3.2 | 4.6 |
| Sweet taste | 5.0 | 5.5 | 4.5 | 4.7 | 4.6 | 4.0 |

The various features of the embodiments of the present invention referred to in individual sections above apply, as appropriate, to other sections mutatis mutandis. Consequently features specified in one section may be combined with features specified in other sections as appropriate.

All publications mentioned in the above specification are herein incorporated by reference. Various modifications and variations of the described methods and products of the invention will be apparent to those skilled in the art without departing from the scope of the invention. Although the invention has been described in connection with specific preferred embodiments, it should be understood that the invention as claimed should not be unduly limited to such specific embodiments. Indeed, various modifications of the described modes for carrying out the invention which are apparent to those skilled in the relevant fields are intended to be within the scope of the following claims.

The invention claimed is:

1. An ice confection which is a water ice or a fruit ice having a total solids content of from 17 to 28% by weight of the ice confection comprising a sweetener system consisting of a mixture of fructose, glucose, and a glucose syrup having a DE in the range of 22 to 34, and non-saccharide sweeteners in a total amount $C_T$ given by the following condition:

$$C_T < X/R,$$

wherein X is 0.5 wt % and R is the sweetness of the non-saccharide sweeteners relative to sucrose expressed on a weight basis;
wherein the fructose is present in an amount of 4% to less than 12% by weight of ice confection;
wherein digestible mono- and di-saccharides are present at a total level of 10% to less than 17% by weight of the ice confection;
wherein digestible complex saccharides are present at a total level of from 5% to less than 15% by weight of ice confection; and wherein the ice confection comprises less than 0.5% protein by weight of ice confection and is unaerated.

2. An ice confection according to claim 1 wherein the the digestible mono- and di-saccharides are present at a total level of 12% to less than 17% by weight of the ice confection.

3. An ice confection according to claim 1 wherein the the fructose is present in an amount of 4% to less than 10% by weight of the ice confection.

4. An ice confection according to claim 1 wherein the ice confection comprises non-digestible saccharides in an amount of at least 2% by weight of the ice confection.

5. An ice confection according to claim 4 wherein the non-digestible saccharides are present in an amount of at most 15% by weight of the ice confection.

6. An ice confection according to claim 4 wherein the non-digestible saccharide is selected from the group consisting of oligofructose, inulin, polydextrose, resistant starch and mixtures thereof.

7. A process for manufacturing an ice confection according to claim 1, the process comprising the steps of:
(a) preparing a mix of ingredients; then
(b) pasteurising and optionally homogenising the mix; then
(c) freezing the mix to produce the unaerated ice confection.

8. A process according to claim 7 wherein freezing is quiescent.

* * * * *